US005633625A

United States Patent [19]

Gaub et al.

[11] Patent Number: 5,633,625

[45] Date of Patent: May 27, 1997

[54] ELECTRONIC CHIME MODULE AND METHOD

[75] Inventors: Guy J. Gaub, Clinton Township; Ray M. Hallenbeck, Waterford, both of Mich.

[73] Assignee: Saturn Electronics & Engineering, Inc., Auburn Hills, Mich.

[21] Appl. No.: 406,546

[22] Filed: Mar. 20, 1995

[51] Int. Cl.$^6$ .......... B60Q 1/00

[52] U.S. Cl. .......... 340/438; 340/384.5; 340/384.7; 340/392.1; 340/393.2; 340/425.5; 340/692

[58] Field of Search .......... 340/384.5, 384.6, 340/384.7, 384.71, 384.72, 384.73, 392.1, 392.4, 392.5, 528, 327, 329, 815.7, 815.79, 815.81, 286.11, 286.12, 692, 425.5, 438

[56] References Cited

U.S. PATENT DOCUMENTS

| | | | |
|---|---|---|---|
| 3,573,630 | 4/1971 | Baer . | |
| 3,742,491 | 6/1973 | Lawson et al. . | |
| 3,912,952 | 10/1975 | Kumon et al. . | |
| 3,940,635 | 2/1976 | Meyer | 307/294 |
| 4,001,816 | 1/1977 | Yamada et al. . | |
| 4,057,769 | 11/1977 | Woolf . | |
| 4,073,133 | 2/1978 | Earls et al. . | |
| 4,111,090 | 9/1978 | Deutsch . | |
| 4,160,132 | 7/1979 | Rea et al. . | |
| 4,179,690 | 12/1979 | Nicholls . | |
| 4,183,278 | 1/1980 | Rea et al. . | |
| 4,193,060 | 3/1980 | Slavin et al. . | |
| 4,193,064 | 3/1980 | Snyder . | |
| 4,213,121 | 7/1980 | Learn et al. . | |
| 4,215,339 | 7/1980 | Durkee . | |
| 4,225,856 | 9/1980 | Learn . | |
| 4,232,287 | 11/1980 | Slavin et al. . | |
| 4,245,336 | 1/1981 | Stietenroth | 368/75 |
| 4,250,496 | 2/1981 | Southgate . | |
| 4,257,036 | 3/1981 | Slavin et al. . | |
| 4,271,495 | 6/1981 | Scherzinger et al. | 340/384.5 |
| 4,280,123 | 7/1981 | Right et al. | 340/384.5 |
| 4,284,857 | 8/1981 | Slavin et al. . | |
| 4,286,257 | 8/1981 | Slavin et al. . | |
| 4,326,276 | 4/1982 | Scott | 340/384.5 |
| 4,387,788 | 6/1983 | Slavin et al. . | |
| 4,516,113 | 5/1985 | Scheckel et al. . | |
| 4,558,305 | 12/1985 | Black et al. . | |
| 4,565,991 | 1/1986 | Lupoli et al. . | |
| 4,603,324 | 7/1986 | Hu . | |
| 4,644,327 | 2/1987 | Patterson . | |
| 4,668,937 | 5/1987 | Shota | 340/384.5 |
| 4,757,542 | 7/1988 | Neahr, II et al. . | |
| 4,771,390 | 9/1988 | Dolph et al. . | |
| 4,825,385 | 4/1989 | Dolph et al. . | |
| 4,833,454 | 5/1989 | Pawlik et al. . | |
| 4,866,415 | 9/1989 | Obayashi et al. | 340/384.5 |
| 4,924,747 | 5/1990 | Lin . | |
| 4,945,346 | 7/1990 | Schmiemann . | |
| 4,954,805 | 9/1990 | Buyak . | |
| 4,977,392 | 12/1990 | Loda . | |
| 4,980,837 | 12/1990 | Nunn et al. | 340/384.5 |
| 5,376,916 | 12/1994 | Ito | 340/384.7 |

*Primary Examiner*—Jeffrey Hofsass
*Assistant Examiner*—Daniel J. Wu
*Attorney, Agent, or Firm*—Harness, Dickey & Pierce, P.L.C.

[57] ABSTRACT

An exponentially decaying chime sound is generated with a single tri-statable output pin from a microprocessor which is implemented using a single digital output pin line to create states of low, high and disconnect which are input to a control circuit for output to a speaker. Preferably, the control circuit comprises a low pass filter in series with a buffer. Preferably, the buffer is a Darlington transistor. Preferably, the speaker is an electro-mechanical device, alternatively it may be a piezo-resistive device. A method is disclosed for generating a desired audible chime signal with a chime generating circuit regulating a tri-statable output via a single pin of a microprocessor to approximately generate a desired signal frequency, and preferably includes regulating said tri-statable output to produce amplitude decay of the desired signal frequency over time.

19 Claims, 9 Drawing Sheets

WAVEFORMS, SINGLE CYCLE:

SOFTWARE, SINGLE CYCLE:

SOFTWARE, MULTI CYCLE (DECAY):

SOFTWARE, IDENTIFIER DESCRIPTIONS:
(PREFERRED IMPLEMENTATION)

| IDENTIFIER: | CLASS: | | RANGE |
|---|---|---|---|
| DECAY_TIME | ΔT | V | |
| LAST_LOOP_TIME | ΔT | D | |
| NEW_CHIME | | D | |
| SINE_AMP | | V | |
| MAX_SINE_AMP | | K | |
| DECAY_INTERVAL | ΔT | V | |
| CHIME'S_DECAY_TIME | ΔT | D | |
| DECAY_SEGMENT | | K | 0 TO 1 |
| OTHER_CODE | | D | |
| CHIME_INTERRUPT_ENTRANCE | | D | |
| SINE_AMP_DELAY | ΔT | V | |
| MAX_DELAY | ΔT | K | |
| SINE_OUTPUT | | P | 0, 1, HI-Z |
| SINE_COPY | | V | 0,1 |
| DELAY FOR . . . | ΔT | D | |
| STEP | | V | |
| NEXT_INTERRUPT_TIME | T | D | |
| THIS_INTERRUPT_TIME | T | D | |
| STEP_TIME | ΔT | K | |
| FLAT_TIME | ΔT | K | |
| NUMBER_OF_STEPS | | K | |
| CHIME_INTERRUPT_EXIT | | D | |
| TRI_STATE | | D | HI-Z |

| KEY: | MEANS (FOR THIS APPLICATION): |
|---|---|
| D | DESCRIPTION, ARBITRARY CODING. |
| V | VARIABLE. |
| K | CALIBRATABLE CONSTANT. |
| P | VARIABLE, MICROCOMPUTER PIN. |
| T | A POINT IN TIME. |
| ΔT | A DELAY BETWEEN 2 POINTS IN TIME. |

FIG - 5

ELECTRONIC CHIME MODULE AND METHOD

BACKGROUND OF THE INVENTION

1. Field of the Invention

The present invention relates to a control circuit for generating a tone and in particular to a control circuit that is adapted to generate a chime sound preferably with an exponential decay.

2. Discussion

Tone generators were previously incorporated on automobiles as a result of the Imposition of Federal regulations requiring four to eight second audible warning signals whenever an automobile is operated without the seat belts properly fastened. Initially, these devices consisted of a buzzer unit controlled by a bi-metallic timer circuit. Before long, the same buzzer unit was further utilized to provide audible signal indications of other monitored vehicle conditions. For example, a single buzzer would sound when a user left a key in a vehicle ignition, or when headlamps were left on after a vehicle ignition was turned off.

However, it soon became apparent that several problems existed with the aforementioned buzzer units, namely, the constant buzzer sound was annoying, and production of the same audible tone for each of a plurality of conditions proved confusing to an operator. Therefore, a variety of devices were developed utilizing readily distinguishable audible signals for each of the conditions monitored in a vehicle. Likewise, tone generators were tailored to produce varying types and frequencies of signals, for example, a chime signal, a pulse tone, or a steady tone, depending on the particular enabling signal which was monitored. After a period of use by customers, it became apparent that the chime sound was the least annoying and most pleasing to the customer, and various implementations were developed.

A variety of devices were subsequently developed which are presently in use for driving tone generators which produce sounds that are pleasing to the human ear. Typically, a control circuit is used which drives a speaker to generate a tone. Preferably, an electro-mechanical or a piezo-electric speaker is utilized with the control circuit. To reproduce a single chime strike, the control circuit must first produce the tone of the desired chime, then gradually decrease the tone's amplitude from an initial loud value to zero. The control circuit must also restart this process periodically if a repetitive chime sound is desired. Various techniques have been utilized to produce the chime tone, control the tone amplitude, and fashion a repetitive chime from individual chime strikes. For example, pulse width modulation has been used to control the tone's amplitude. Similarly, tones have been generated from reconditioned square wave signals provided by simple logic gate oscillator circuits.

Another technique for synthesizing an amplitude modulated tone signal employs resistor-capacitor circuits, or RC networks. The capacitor is rapidly charged and subsequently slowly discharges through the resistor to produce a voltage waveform. This waveform amplitude modulates the tone signal to provide a high quality chime. A desired waveform can be fashioned by properly selecting values for the capacitor and resistor, and by appropriately controlling the voltage applied to the resulting network. The discharge rate of the capacitor is influenced by the impedance of components to which the output of the RC network is applied, for example an amplifier and speaker. Unless the impedance of the output components is kept high, leakage from the capacitor through these components will alter the waveform produced by the RC network resulting in a highly distorted sound. Although this circuit can produce a desired chime, the ability to produce a multitude of different chimes having different frequencies and different decay rates is somewhat limited and requires formation of alternative circuit elements which are selectively electrically coupled to produce a desired particular chime.

SUMMARY OF THE INVENTION

Thus, it is one of the principal objects of the present invention to provide an improved control circuit that is adapted to cause a tone generator, namely a speaker, to which it is connected to produce readily distinguishable audible chime tone signals for each of a plurality of monitored conditions in a vehicle. In particular, the present control circuit is adapted to drive a speaker to generate at least one tone, and preferably a plurality of different chime tones, by receiving software controlled digital information from a single tri-statable output port of a micro-processor-based microcontroller. By carefully selectively driving the tri-statable output between high, low, and disconnect (i.e., high impedance) states, this output provides an input voltage to a conditioning circuit in a manner which produces a voltage output signal from the conditioning circuit having the desired sine wave frequency for generating a tone through a speaker. Furthermore, preferably a software based routine varies the amplitude of the generated sine wave in an approximate exponentially decaying manner by varying the duration of the high, low and disconnect states of the tri-statable output. This produces a corresponding exponentially decaying sinusoidal voltage to the speaker which creates a corresponding decaying chime sound. Additionally, the microprocessor is free to process various other vehicle inputs and various other vehicle outputs during the time that the tri-statable output is held at a disconnected state.

In addition, it will also be seen that the control circuit of the present invention is reliable, is relatively simple in design, is readily and easily tailored by modifying software resident in the microcontroller, and uses relatively simple low-cost circuit elements. Further, the control circuit is operated from a single pin of a microprocessor or microcontroller which is tri-statable, and which allows the same microprocessor or microcontroller to be utilized for other operations. Therefore, the present invention's approach to quality tone generation is exceptionally low in cost. Moreover, the small size required for the control circuit reduces circuit board requirements, thus making the control circuit, and its microcontroller and software further suitable for automotive use where electronic module space is at a premium. Furthermore, the ability to readily and easily tailor chime generation through software changes is also attractive in the automotive environment.

In general, the control circuit for the present invention comprises a single tri-statable output pin on a microprocessor or microcontroller that controls a conditioning circuit which outputs to a buffer and a tone generator, which preferably is a speaker. The tri-statable single pin output controlled by the microcontroller provides a digital line having three different possible input states namely, low, high, and tri-stated (disconnected). The conditioning circuit is preferably a single phase, RC, low-pass filter which by definition passes DC signals and low-frequency AC signals, and rejects high frequency AC signals. Such a RC low-pass filter is constructed by placing a resistor in series with a capacitor across the voltage input and extracting a voltage output across the capacitor.

The response of such a low-pass filter to a step amplitude voltage input is commonly known, namely the output voltage rises over time to asymptotically approach the input voltage. Whenever the microcontroller pin is pulled to a high state, the circuit responds by gradually increasing the voltage output. Whenever the microcontroller pin is pulled to a low state, the circuit responds by gradually decreasing the voltage output. Whenever the pin is disconnected (tri-state), the voltage output remains constant. By repetitively pulling the pin between the disconnected and high states in a timed, sequentially controlled manner, an approximation to the rising first half of a sine wave is constructed. By subsequently repetitively pulling the pin between the disconnected and low states in a timed, sequentially controlled manner, the falling second half of the sine wave can likewise be approximately constructed. If this two-part sequence is repeated, a somewhat jagged, but approximately sinusoidal shaped voltage output results from the low-pass filter. Preferably, the output pin is held at the tri-stated condition for an extended period of time at the peak and trough of each sine wave voltage output in order to more closely approximate the desired sine wave.

The output from the low pass filter subsequently inputs preferably into a buffer. The buffer is preferably provided by a Darlington transistor having an extremely high impedance in order to match the impedance requirements of a desired output speaker.

Preferably, the output speaker is an electro-mechanical speaker. Alternatively, the speaker may be a piezo-electric device. When a piezo-electric device is used, it is possible to construct the circuit while eliminating the buffer.

The aforementioned circuit produces a desired approximately sinusoidal waveform output to a speaker by controlling the tri-state pin output from the microcontroller. This control is preferably provided by an interrupt-driven software routine residing in the microcontroller. A second software routine is preferably used to send amplitude data to the first routine. The second routine controls the amplitude of the above sine wave in order to produce a decaying chime strike preferably with an approximately exponential decay. Such a decaying chime strike is repeatedly generated to produce a repetitive chime sound.

Additional objects and advantages of the present invention will become apparent from a reading of the detailed description of the preferred embodiments which make reference to the attached drawings, which shall now be briefly described.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 5 is a listing of identifier descriptions for the software subroutines depicted in FIGS. 3 and 4;

DETAILED DESCRIPTION OF THE PREFERRED EMBODIMENTS

A. SYSTEM OVERVIEW AND HARDWARE

Figure 1:
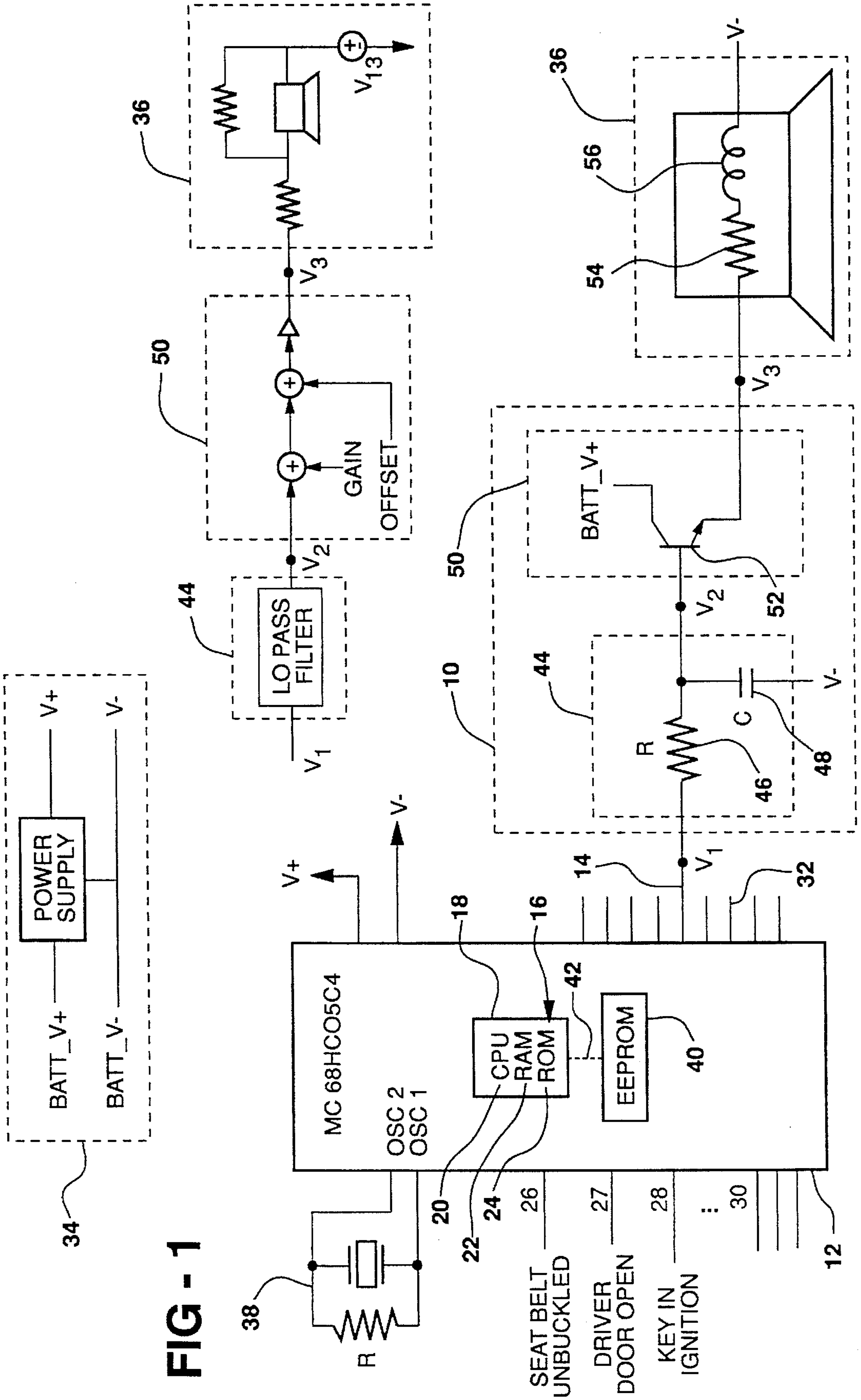
FIG. 1 is a circuit diagram of an electronic chime module control circuit according to the present invention, including a microcontroller.

Referring to FIG. 1, a somewhat schematic circuit diagram of a control circuit 10 according to the present invention is shown. The circuit diagram further shows a functional block diagram by way of overlaid dashed-line blocks in accordance with the present invention. The control circuit and speaker arrangement have been depicted as functional groups, namely as a filter, buffer, and speaker which correspond with respective dashed-line blocks connected to output pin 14 in the preferred embodiment of FIG. 1.

A microprocessor-based control system, or microcontroller 12 has a single dedicated output pin 14 which transmits a tri-statable digital signal to the control circuit 10 in response to an internal software program 16 preferably resident in the microcontroller 12. A microprocessor 18 internal to the microcontroller is pre-programmed with the software program 16 and has a Central Processing Unit (CPU) 20, Random Access Memory (RAM) 22 and any combination of Read Only Memory (ROM) 24, Erasable Programmable Read Only Memory (EPROM), or Electronically Erasable Programmable Read Only Memory (EEPROM). Microcontroller 12 has a plurality of inputs, including inputs 26–28 and pin 30, and a plurality of outputs including chime output pin 14 as well as other outputs, including pin 32, dedicated to various other devices. A power supply 34 also provides power to the microcontroller 12, the control circuit 10, as well as a speaker 36. An oscillator 38 is further provided as a time-base for clock-regulating the microcontroller 12 and its software program 16.

Control circuit 10 as shown in FIG. 1 is preferably constructed with a single stage, RC low-pass filter 44 having a resistor 46 in series with a capacitor 48 across the voltage input $V_1$ and the capacitor 48 in parallel with voltage output $V_2$. Low-pass filter 44 is used to condition the voltage values from output pin 14 which is tri-stated between values of high, low, and disconnect. Such a low-pass circuit is a first-order system which passes DC signals and low-frequency AC signals, and rejects high frequency AC signals. It is generally known in the art that the response of such a low-pass filter is to produce an output voltage which decays so as to asymptotically approach the input voltage over time.

A buffer 50 is also included in control circuit 10 and is preferably provided by a Darlington transistor 52 having an extremely high impedance. Preferably, the gain on the transistor 52 is in the range of 5,000–10,000, and can be as high as 20,000. Such a gain requirement is necessary in order to impedance-match the output $V_3$ with respect to a desired speaker 36. Readily commercially available Darlington transistors each typically consist of a Darlington pair of transistors which are packaged as single composite transistor having only three external leads. Transistor 52 is preferably a Darlington MPSW45A transistor manufactured by Motorola.

The control circuit 10 outputs $V_3$ to the speaker 36 for generating a desired tone or chime. Preferably, speaker 36 is an electro-mechanical speaker.

Various alternative constructions for the filter 44, buffer 50, and speaker 36 can be envisioned as shown in the general implementation of FIG. 1. Certain selected variations shall be discussed in FIG. 7 hereinafter. For example, a plurality of RC circuits can be connected in series to form the filter. Likewise, a buffer can be formed from Darlington, MOSFET, or other similar transistors variously utilizing either high or low side drivers. Furthermore, alternative speaker implementations can utilize electromagnetic or piezoelectric speakers, either with high or low side drivers.

Microprocessor-based controller 12 is preferably configured from a Motorola MC68HC05C4 device. A plurality of input pins including inputs 26–28 receive monitored status signals from various vehicle components. Input 26 for example receives sensed information on the latch condition of a seat belt. Other typical input interfaces to the microprocessor system might include the status of vehicle interior lighting, door lock functions, turn signal conditions, and vehicle park conditions. One of the principal uses of such a microcontroller system is to monitor a variety of vehicle conditions and apprise the vehicle user and/or other vehicle hardware of the existence of certain status conditions related to each of these devices as they are sensed by the microprocessor 18. In response to certain sensed conditions, software program 16 can direct the microprocessor to trigger control circuit 10 to produce a specific chime tone through speaker 36 which alerts the vehicle operator to a specific condition. For example, when a driver's seat belt is not latched and the door is sensed as being shut while the vehicle is running (ignition is on), a particular chime tone can be generated to alert the driver to the unlatched driver seat belt condition. A second, separate and audibly distinguishable chime having a different tone or different decay rate can likewise be produced under microprocessor control to notify the driver that a vehicle interior light has been left on. Furthermore, a third additional chime tone can be produced to notify the driver that a turn signal indicator has been left on for an extended duration. In a similar manner, various other functions can be monitored and suitable audio warning tones produced when the situation warrants it. For example, a driver who leaves a vehicle key in the ignition while the engine is off and the door is open can be immediately alerted, before he closes the door and inadvertently locks the keys inside the vehicle.

One of the difficulties associated with implementing the control circuit 10 with a microprocessor is the anticipated need to dedicate the microprocessor to the job of driving the control circuit. However, by using the methods of the present invention, the microprocessor 18 is only required to be used chiefly during the activated states of the output pin 14, namely while it is either at a high or a low state. Therefore, microprocessor 18 has some time available with which to monitor various other vehicle devices and run various other software routines while output pin 14 is at a disconnected (tri-stated) state. Software program 16 generates a sinusoidal signal preferably having an exponentially decaying chime rate by discretely activating control circuit 10 through output pin 14 between high, low, and disconnected states. By activating output pin 14 between the three states in a manner to be described hereinafter, an approximate sinusoidal signal having a desired amplitude is produced at output $V_1$ which is conditioned via low-pass filter 44 to produce voltage $V_2$, which is subsequently buffered via transistor 56 to produce output $V_3$ for delivery to speaker 36.

Figure 2:
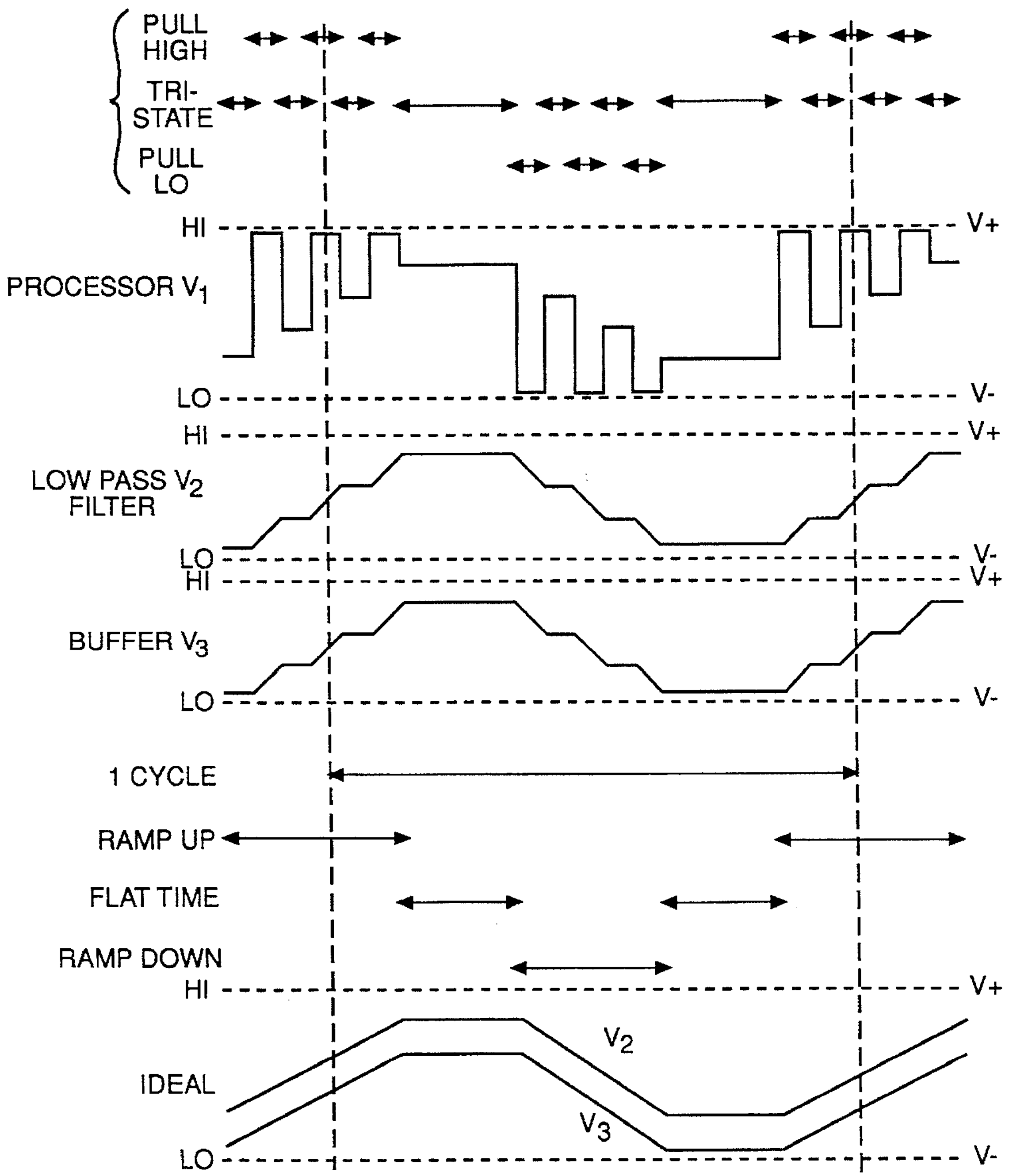
FIG. 2 is a timing diagram illustrating the manner in which the tri-statable microcontroller output is software modulated to generate an approximate sinusoidal output to a speaker.

FIG. 2 depicts the resulting waveform signal at locations $V_1$, $V_2$ and $V_3$ along the control circuit 10. The tri-statable output at output pin 14 can take on values of high, low, and tri-state which is a high-impedance, effectively disconnected state. By sequentially changing values of output pin 14 between such states under direction of an interrupt driven software routine contained in software program 16, control circuit 10 produces an approximate sinusoidal output at speaker 36. Furthermore, under direction of a separate software routine also contained in software program 16, the amplitude of the approximately sinusoidal output can be decreased in an exponentially decaying manner to produce an exponentially decaying chime tone at speaker 36. As will be discussed below, software program 16 provides a routine for pulling output pin 14 between each of the possible values of high, low, and high-impedance in order to tailor the voltages at $V_1$ to produce an approximate sinusoidal output at $V_2$ and $V_3$, and preferably includes a routine which decreases the sine wave amplitude to produce an exponentially decaying chime tone. By selectively pulling output pin 14 between a tri-stated condition and a high state in a timed manner, the rising first half of an approximate sine wave is created at $V_2$ which is buffered and remains substantially the same at $V_3$ for output to speaker 36. Likewise, by pulling pin 14 sequentially between a low state and a tri-state condition, the falling second half of an approximate sine wave can be simulated at $V_2$ and $V_3$.

As shown in FIG. 2, pin 14 is held at the tri-stated, or high-impedance state, for an extended period over the peaks and troughs of the simulated sine wave of $V_2$ and $V_3$. The resulting approximate sinusoidal signal $V_2$ is produced by the pulled values at output pin 14 passing through low-pass filter 44. Furthermore, buffer 50, which is preferably a linear buffer, further tailors the signal $V_2$ by shifting it vertically to lessen the signal's DC component. This results in $V_3$ which is subsequently input through speaker 36 in order to generate the desired tone, preferably a chime.

Figure 3:
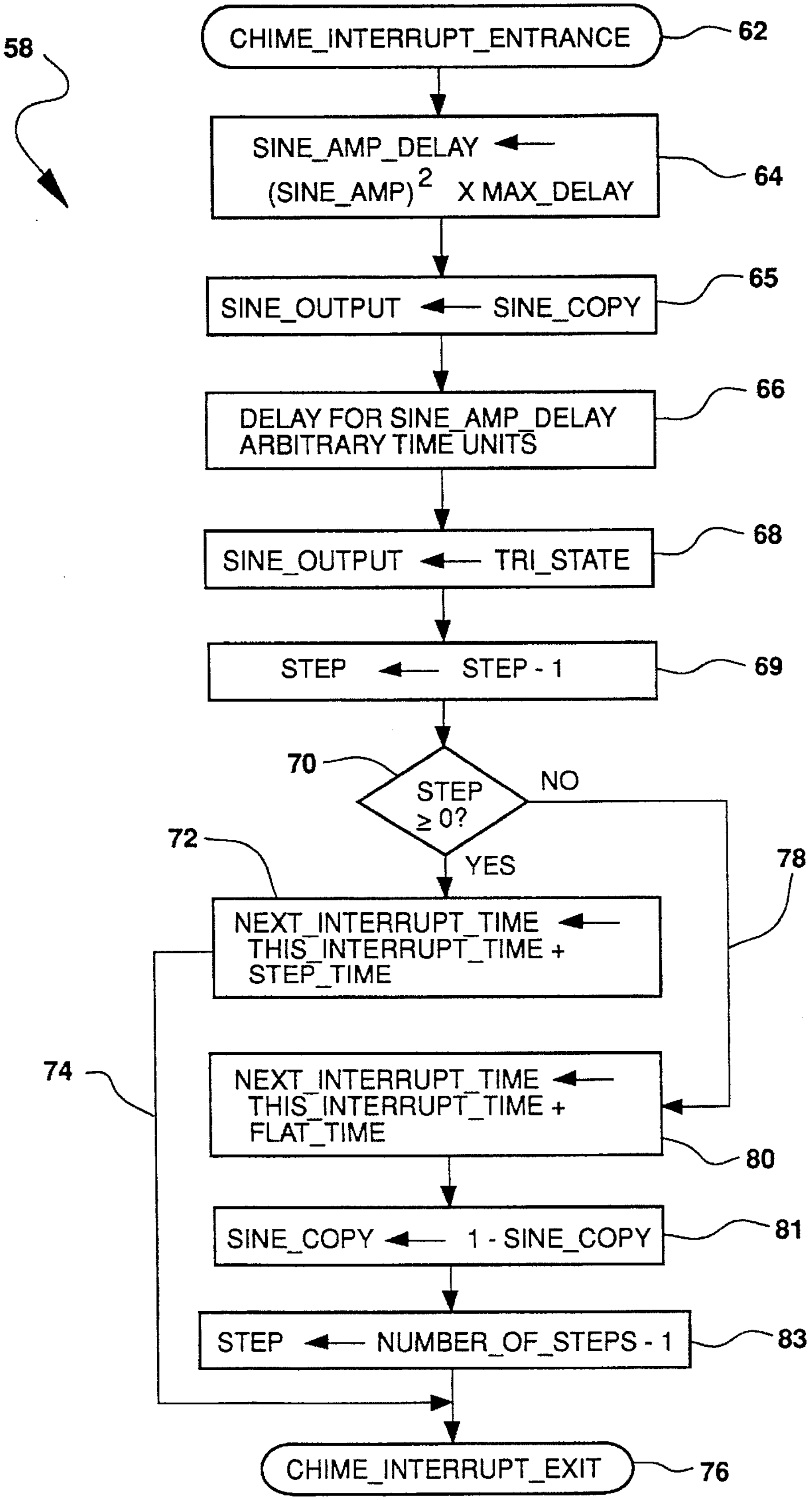
FIG. 3 is a software flow chart of the microcontroller based software, for modulating the tri-statable microcontroller output of the control circuit of FIG. 1 which generates the approximate sinusoidal output as depicted in FIG. 2.

An ideal desired approximate sine wave generated by the software of FIG. 3 is depicted at the bottom of FIG. 2 wherein $V_2$ and $V_3$ are depicted in relation to the actual values generated by control circuit 10. The rising portion of the sine wave produced by alternately pulling pin 14 between a high state and tri-stated condition takes up one third of a complete sine wave cycle. Each peak and each trough which are formed by holding pin 14 at a tri-stated or disconnected state extend for ⅙th of a sine wave cycle. The falling portion of the sine wave produced by alternating pulling pin 14 between a low state and a tri-state condition accounts for the remaining ⅓rd of a complete sine wave cycle. As a result, the sine wave cycle comprises a ⅓rd ramp up portion, then a ⅙th flat time portion, then a ⅓rd ramp down portion, and lastly a ⅙th flat time portion.

B. SOFTWARE ORGANIZATION AND IMPLEMENTATION

Figure 4:
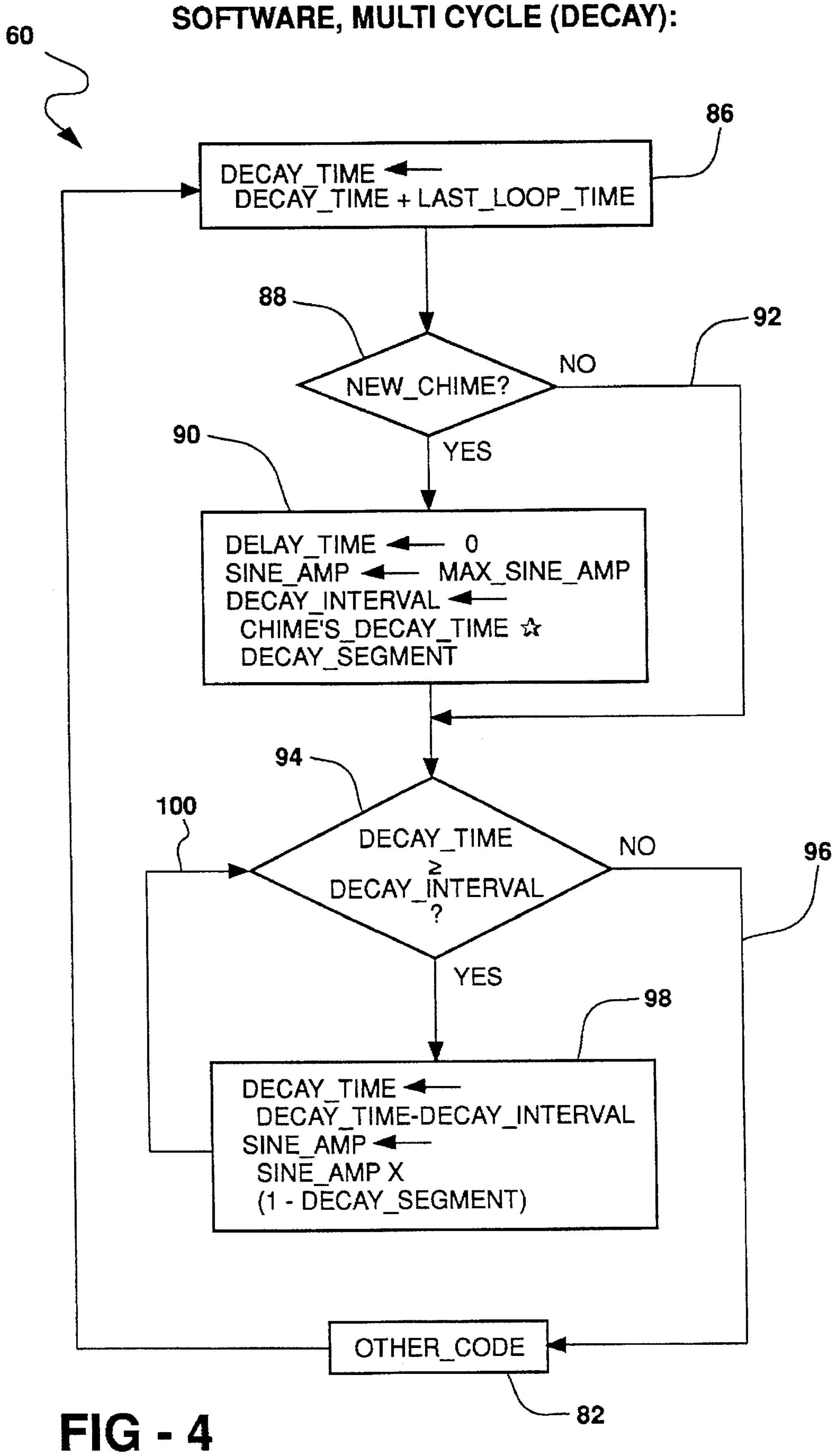
FIG. 4 is a software flow chart of the microcontroller based software used to produce an approximate exponential decay of the amplitude of the sine wave generated by the flow chart of FIG. 3 in order to produce an exponentially decaying chime.
Figure 6:
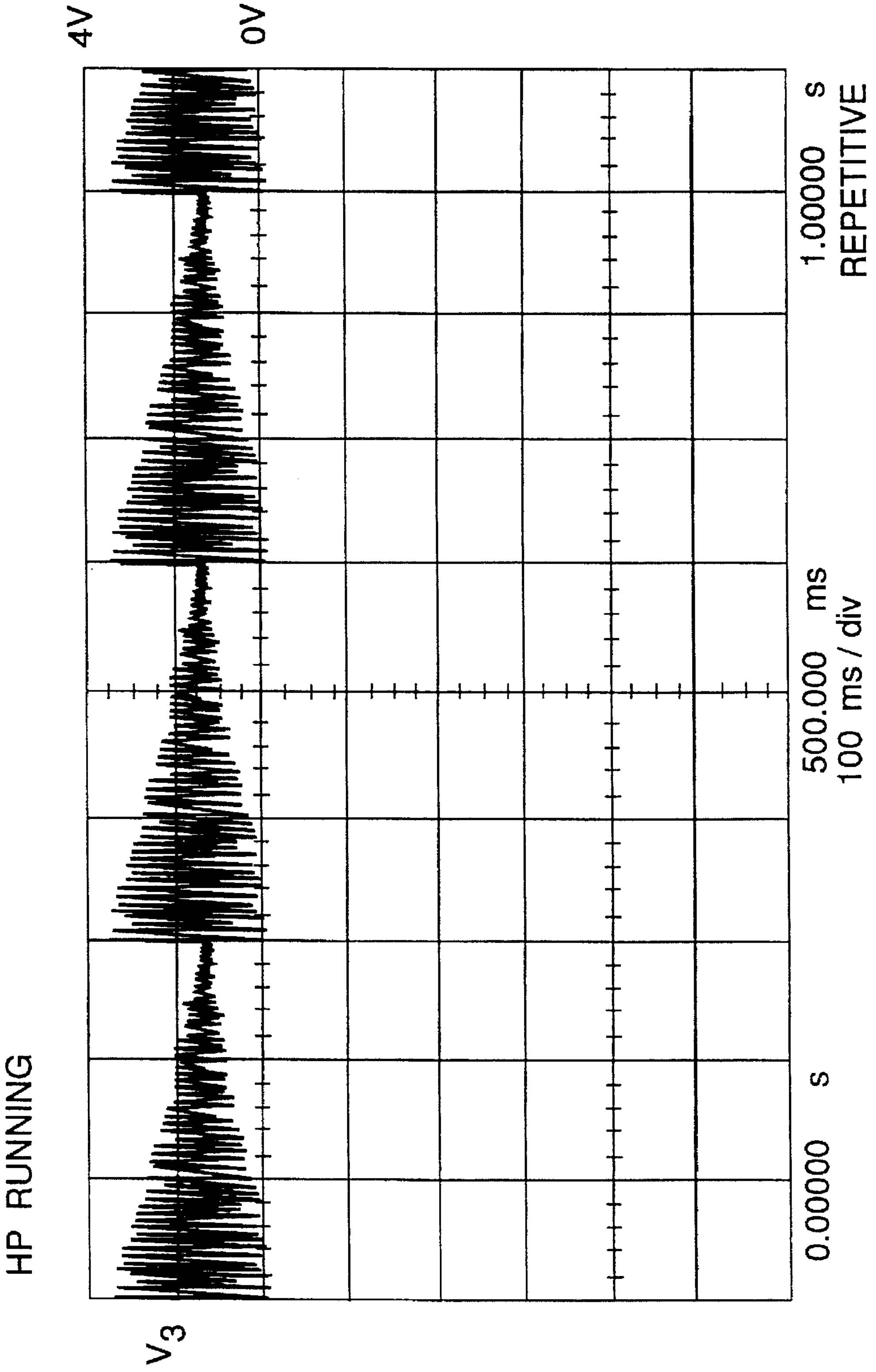
FIG. 6 is an exemplary chime signal generated by the circuit and speaker of FIG. 1 as a result of implementing the software shown in FIGS. 3–5.

FIG. 3 depicts a portion of software program 16 which produces the approximate sinusoidal signal shown in FIG. 2. Namely, it directs microcontroller 12 to pull pin 14 between the appropriately timed high, low and tri-stated values in order to produce the approximate output $V_2$ to obtain an approximate sinusoidal waveform. In combination, FIG. 4 depicts an additional portion of software program 16 which produces an approximate exponential decaying chime by iteratively decreasing the amplitude of the sine wave generated by the software of FIG. 3. FIG. 5 is a reference table relating to FIGS. 3 and 4 which lists identifier descriptions for the software implemented in the routines shown in FIGS. 3 and 4. Finally, FIG. 6 depicts an exemplary chime signal which is generated by running the routines of FIGS. 3 and 4 together with another undocumented routine which periodically schedules new chime strikes.

The software user programs of FIG. 3 and 4 are flow-charted using identifier descriptions which are substantially self-explanatory to facilitate reader understanding and are not representative of any particular programming language. Therefore, FIG. 5 lists the identifier descriptions for the software subroutines depicted in FIGS. 3 and 4. As shown in FIG. 5, each identifier is classified via a key which characterizes each identifier utilized for this particular application. For example, "DECAY_TIME" is classified as a variable and as a differential time delay between two points in time. Where appropriate, a range of values is given for each identifier as utilized in this application.

Turning now to FIG. 3, there is shown a flow chart which details the sequence of operations of a software routine 58 for generating an approximation to a single cycle sine wave. The software program, or routine is part of a ganged interrupt routine which is accessed based on interrupt priority established by the microprocessor 18 in which the software is stored. The microprocessor 18 utilizes interrupts to communicate with various devices of the microcontroller in a responsive manner.

The flow chart in FIG. 3 begins with entrance to the chime interrupt 62. Entrance 62 forms part of the ganged interrupt routine. The interrupt routine services events which require immediate attention. In use, normal software execution stops, the event is serviced, after which normal software execution proceeds where it left off. By way of example, it is the equivalent of a person interrupting their normal daily activities in order to take care of a sudden emergency, and then subsequently resuming their normal daily activities. Moreover, interrupt routine execution is triggered by an event occurring on one of the microcomputer's devices. In the case of such an event, the allotted time assigned to the timer has expired. For example, a real-life equivalent would be the ringing of a buzzer when a set duration of time expires on a stove-mounted cooking timer.

In operation, several different hardware devices may trigger execution of the same interrupt routine. Therefore, it becomes probable that the ganged interrupt routine will sooner or later have to decide which device to service as several devices trigger execution of the same routine. For example, revisiting the stove analogy, ringing of the stove buzzer may signal to an operator that meat or potatoes being cooked on the stove are done. Although it might be obvious, an operator must still remember which food is being timed, and subsequently which food needs to be removed from the stove to terminate cooking in response to the buzzer ringing.

Process block 64 which follows interrupt 62 first precompensates and then scales the sine wave's current amplitude. Precompensation is accomplished by squaring the amplitude wherein this process corrects for the reduced ability of output 14 to pull $V_2$ to the high and low states when the amplitude is large. This reduced ability is an inherent limitation of filter 44. Precompensation, by forcing low amplitudes even lower, effectively makes high amplitudes appear proportionally higher.

Accordingly, block 64 operates to convert the sine amplitude to a delay time. SINE_AMP, which is an identifier for the sine amplitude is assigned values by the software depicted in FIG. 4 and discussed hereinafter. In short, a maximum delay is multiplied by the squared value for the sine amplitude which converts the amplitude value to a time duration value, which is subsequently stored in SINE_AMP_DELAY. This operation precompensates for the reduced ability of the filter circuit 44 to respond as fully to large amplitudes as it is able to for small amplitudes. Toward the end of the ramping, large amplitudes have a much smaller gap between $V_1$ and $V_2$. This smaller gap means more time is needed in order to accomplish a given amplitude change. Such an effect is presently well known in the art. Consequently, large amplitudes appear squashed. Therefore, this effect is compensated for by squashing the small amplitudes through implementation of the software. For this particular application, SINE_AMP is squared in order to achieve this result. The original amplitude appears reduced but fairly undistorted at $V_2$ as a net result.

Equally worth noting, the MAX_DELAY of block 64 is a constant that sets the loudness of a maximum amplitude signal. By multiplying the precompensated amplitude by MAX_DELAY, the precompensated amplitude is converted into a time delay. As a result, the delay is converted into the same arbitrary time units as MAX_DELAY. As noted above, MAX_DELAY is then multiplied by the square of SINE_AMP, and the result is stored in AMP_DELAY.

Block 65 is implemented subsequent to block 64 whereby a copy of the next desired high or low state of output pin 14 is copied to the microcomputer's output pin, SINE_OUTPUT. Accordingly, SINE_OUTPUT controls the state of output pin 14. For both SINE_COPY and SINE_OUTPUT, a 1 indicates pull high and a 0 indicates pull low. As a result, the corresponding values pull the microcomputer's output pin either high or low as desired. When SINE_OUTPUT is tri-stated by assigning it the value in TRI_STATE, the pin is disconnected. With this object, SINE_COPY is loaded into SINE_OUTPUT, thus forcing the output pin 14 high or low as SINE_COPY dictates. With each loading step, a new single step of the ramping sequence is initiated. In operation, SINE_COPY is initialized with a copy of a value stored in RAM 22 which indicates a value of 1 or 0 (high or low). The value in SINE$_{COPY}$ is then dumped into SINE_OUTPUT from which the microprocessor 18 is told whether or not to pull pin 14 high or low. In summary, when SINE_OUTPUT is 0, the pin is pulled low, when SINE_OUTPUT is 1 the pin is pulled high, and when SINE_OUTPUT is at the value for TRI_STATE (some value other than 0 or 1), the pin is disconnected.

Block 66 is subsequently implemented to impart a delay for SINE_AMP_DELAY which allows for the ramp to occur. By increasing the delay, the amplitude is increased as an increased amount of ramping is allowed. Preferably, the delay value for SINE_AMP_DELAY is an increment of about 2 microseconds. One-third of the rising first-half of the SINE waveform (namely, ⅙th of a single cycle) is assigned a flat time by disconnecting, or holding pin 14 at a TRI_STATE condition. Preferably, the flat time, or disconnect time is stored in RAM. Alternatively, the flat time can be stored in ROM when the value is a constant due to a constant fundamental frequency. Both the flat time and the step time in the routine of process block 66 are dependent on the frequency of the approximated SINE waveform.

Block 68 depicts where SINE_OUTPUT is loaded with the tri-state value. Therefore, output pin 14 is disconnected as a result. As a consequence, a single step of the ramping sequence is terminated. Preferably, the number of steps is set at three.

Block 69 subsequently implements a decrement of STEP. Upon reaching block 69, one of the steps in the ramping sequence has been completed, and the value STEP is then decremented to count the number of times that pin 14 is pulled high or low. Here, if STEP is three, it is immediately decremented to STEP=2 before proceeding to the first pass through decision diamond 70. Hence, each decrement indicates completion of one of the steps in the ramping sequence. Subsequently, a decision diamond 70 directs implementation of the program based on the value assigned to STEP. When STEP is greater than or equal to zero, process block 72 is implemented, wherein the interrupt's time is incremented by STEP_TIME to obtain a new interrupt time. If this was the last step in a ramping sequence, STEP will be less than or equal to zero and block 80 will be executed to prepare ramping in the opposite direction, namely falling if rising was previously orchestrated, and to implement a required delay for the flat part of the SINE wave. Otherwise, STEP will be greater than zero and block 72 is executed to continue ramping in the same direction and to delay until the next step of the ramping sequence is called for by the software implementation.

Where directed by decision diamond 70, process block 72 is implemented in order to schedule the next time at which the interrupt routine must be executed. For this particular interrupt routine, the scheduled point of time for the current execution (i.e. THIS_INTERRUPT_TIME) is taken, a delay representing the time between adjacent steps in the SINE wave (i.e. STEP_TIME) is added to it, and the resulting value is stored as the scheduled point of time for the next execution (i.e. NEXT_INTERRUPT_TIME). Accordingly, STEP TIME is ⅓rd of the SINE wave's period (i.e. RAMP_TIME) divided by the number of steps in the ramping sequence (i.e. NUMBER_OF_STEPS). Likewise, RAMP_TIME is determined by the desired tone/frequency. For this application, RAMP_TIME NUMBER_OF_STEPS, and thus STEP_TIME are constants. For this particular implementation, NUMBER_OF_STEPS is set at three for illustration. Upon completion, block 76 is subsequently executed via flow path 74. Alternatively, decision diamond 70 directs subroutine 58 via flow path 78 to process block 80.

Process block 80 schedules the next time at which this interrupt routine is executed. For the interrupt routine, the scheduled point of time for the current execution (i.e., THIS_INTERRUPT_TIME) is taken, a delay representing the time for the flat part of the SINE wave (i.e. FLAT_TIME) is added to it, and the resulting value is then stored as the scheduled point of time for the next execution (i.e. NEXT_INTERRUPT_TIME). In this case, FLAT_TIME is ⅙th of the SINE wave's period and is thus determined by the desired tone/frequency. For this particular application, FLAT_TIME is set as a constant. Particularly, process block 80 adds THIS_INTERRUPT_TIME by adding to FLAT_TIME to provide NEXT_INTERRUPT_TIME.

Process block 81 subsequently flips the direction of ramping; if it was high it becomes low, if it was low it becomes high. In this case, SINE_COPY is assigned a value by subtracting the present value of SINE_COPY from the value of 1.

Next, process block 83 is implemented in order to begin a new ramping sequence. Specifically, a new value for STEP is assigned by retrieving the calibratable constant NUMBER_OF_STEPS and decreasing it by the value of 1.

Subsequently, block 76, or the time interrupt exit is executed in order to acknowledge completion of the interrupt so that we will not inadvertently retrigger executing this particular interrupt upon returning control back to the normal software execution. The real-life equivalent would be to turn off a stove's buzzer, and subsequently resume normal household activities, or in this case resume normal software execution. Generally, upon completion of process block 72, routine 58 is directed to the chime interrupt exit 72 which declares exit from the routine and tells the microprocessor that the routine is completed.

In summary, several observations are to be noted during implementation of software 58. Namely, by updating SINE_COPY in block 81, values for SINE_COPY of 1 and 0 are alternately produced from sequential runs of the software routine 58 which provides for generation of the positive, or rising first-half of a SINE waveform and subsequently, a negative, or falling second-half of the desired SINE waveform. Secondly, increasing NUMBER_OF_STEPS gives a more ideally shaped PSEUDO-SINE wave. However, MAX_DELAY must be decreased, or else the time scheduled for the next execution (i.e. NEXT_INTERRUPT_TIME) may pass before the time of the present execution completes. The decreased MAX_DELAY results in less allowed amplitude levels. Finally, the functional intent of blocks 65, 66, and 68 has been detailed. However, the exact mechanism by which each of these is implemented is not directly shown, as its particular implementation can be carried out in several commonly known ways. Furthermore, for the case where SINE_AMP_DELAY is zero, a slightly different implementation must be undertaken since a residual delay remains as the microcomputer executes the code of block 65, 66, and 68. As a result, when SINE_AMP_DELAY is zero, block 65 will be overridden, forcing SINE_OUTPUT to zero instead. This would provide a required momentary turn-off of output pin 14 which would eventually pull $V_2$ low. This would subsequently allow the speaker's current to decay to zero, thereby lessening the power dissipated by the buffer. Since this decay is gradual, the speaker does not click as it turns off.

Turning now to FIG. 5, there is shown a software routine flow chart detailing the sequence of operation of the software routine 60 which produces an exponentially decaying envelope for the multi-cycle sine waveform. Preferably, routine 60 is not rendered as an interrupt. Alternatively, routine 60 can be rendered as an interrupt similar to that implemented with routine 58. Although routine 60 does not need to be executed on a fixed periodic timetable, it does need to be executed often enough so that a decay envelope is developed which is not overly ragged. The implementation of routine 60 begins with process block 82 which contains OTHER_CODE. In this case, OTHER_CODE can be any software subroutines or codes which are implemented by microprocessor 18 to run or monitor various other vehicle functions. Routine 60 is then run upon full completion of OTHER_CODE via flow path 84 to process block 86. Alternatively, by running routine 60 on an interrupt basis, the implementation of routine 60 will not be dependent on the running of the various OTHER_CODE resident in microprocessor 18. Process block 86 updates the DECAY_TIME by adding the LAST_LOOP_TIME. DECAY_TIME monitors how much time has passed since the chime's amplitude was last updated. LAST_LOOP_TIME monitors how long it has been since the last time this section of code was executed by the microprocessor 18.

Decision diamond 88 directs execution of software routine 60 between two directions. Block 90 is executed whenever it is necessary to generate a new chime. If NEW_CHIME is periodically briefly asserted, a recurring chime strike results. Flow path 92 directs implementation of software routine 60 around process block 90 to decision diamond 94 when generation of a new chime is not necessary.

Process block 90 sets DECAY_TIME to zero, SINE_AMP to the maximum amplitude MAX_SINE_AMP, and DECAY_INTERVAL to CHIME'S_DECAY_TIME multiplied by DECAY_SEGMENT. In summary, DECAY_

SEGMENT determines how fast the exponential decay envelope is updated. Similarly, DECAY_SEGMENT is stated as a fraction of CHIME'S_DECAY_TIME, or the current chime's exponential time constant. CHIME'S_DECAY_TIME is the time needed for a single time constant of exponential decay to occur for the selected chime. If two or more decay rates are supported, as is the case for this particular application, then CHIME'S_DECAY_TIME is a variable. If only a single decay rate is desired, then CHIME'S DECAY TIME can be a constant.

Moreover, DECAY_SEGMENT is the reciprocal of the number of amplitude updates found within CHIME'S_DECAY_TIME (i.e. one time constant of decay). If ten updates to the amplitude are desired within the single time constant of decay, DECAY_SEGMENT will be 0.1. Essentially, DECAY_SEGMENT affects how ragged the decay envelope will appear. With each update, the amplitude of DECAY_SEGMENT is reduced to 1-DECAY_SEGMENT of its previous value. DECAY_SEGMENT ranges between 0 and 1 wherein smaller values produce smoother envelopes but require software routine 60 to be visited more frequently. In practice, values around 0.1 tend to produce a fairly smooth and acceptable envelope.

Similarly, DECAY_INTERVAL is the time between amplitude updates. Multiplication of DECAY_SEGMENT, which is a fraction of the time constant, by the CHIME'S_DECAY_TIME time constant yields the update time.

Finally, the reference to "time constant" refers to the period of time during which exponential decay will reach 1/e of its former value, wherein e is Euler's number, approximately 2.718. As such, CHIME'S_DECAY_TIME is significant in that it determines how long it will take to decay to approximately forty percent of an original value.

Subsequently, decision diamond 94 directs software routine 60 in one of two directions, depending on the value of DECAY_TIME in relation to DECAY_INTERVAL When DECAY_TIME is greater than or equal to DECAY_INTERVAL, the program transfers to process block 82 to execute other-code. Alternatively, while DECAY_TIME is greater than or equal to DECAY_INTERVAL, process block 98 executes. Process block 98 is responsible for performing one amplitude update of the exponential decaying chime. Process block 98 decreases DECAY_TIME by DECAY_INTERVAL. In excess time beyond the current update interval is thus retained for the next update interval. SINE_AMP is likewise decreased by multiplying it by 1-DECAY_SEGMENT, wherein this functions as the amplitude adjustment. After the amplitude update of block 98, execution resumes with the decision diamond 94 as opposed to box 82. Accordingly, this protects against a randomly protracted decay caused by two or more amplitude updates needing service during this visit to box 60 and only a single amplitude update being served during this visit to box 60. In the event block 82 lasts too long, two or more amplitude updates needing service can occur.

It is to be understood that both CHIME'S_REPEAT_TIME and DECAY_SEGMENT are proportional to the effective amplitude downgrading on the generated sine wave output. Therefore, the amplitude of the sine wave is only decreased when the decay time is greater than or equal to the decay interval.

FIG. 6 depicts a sample chime generated by Implementation of routine 58, routine 60 and the circuit of FIG. 1.

C. ADDITIONAL FEATURES AND ENHANCEMENTS

FIGS. *7a* through *7f* depict various alternative configurations for the control circuit 10 and speaker 36 utilized in the FIG. 1 embodiment. Generally speaking, each of these alternative configurations for the control circuit 10 and speaker 36 comprise alternative filters, buffers, and speakers which are generally disclosed as functional groups by the general implementation of the circuit and speaker depicted in FIG. 1. Each of these implementations provide particular attractive attributes depending on the specific circuit and speaker utilized which affect cost, power, and ease of implementation. The preferred embodiment discussed hereinabove and shown in FIG. 1 preferably has the following characteristics and provide the following accompanying benefits. The filter as discussed above is an RC low-pass filter which Is of low cost and simple to implement. The buffer is preferably a Darlington transistor used as a high side driver. The speaker is preferably a 3V electromagnetic 16 ohm speaker.

FIG. *7a* depicts an alternative construction having the same low-pass filter 44 of FIG. 1 with a modified buffer 110 wherein resistor 112 is provided at the collector of transistor 52 and speaker 36 is provided at the emitter. Preferably, the buffer consists of a Darlington transistor together with a resistor forming a high side driver. It powers a speaker with an impedance of at least 30Ω, power of 75 mW at 1.5 V bias, and a voltage of at most 3 V peak-to-peak. However, this embodiment is more costly than the preferred buffer embodiment depicted in FIG. 1.

Alternatively, FIG. *7b* depicts a construction wherein the low-pass filter 44 of FIG. 1 is utilized with a modified buffer 120 implemented with a diode 122 provided on the high side of transistor 114 as used in FIG. *7a*. Similarly, speaker 36 is provided at the emitter therealong. Preferably, the buffer consists of a Darlington transistor together with a Zener diode forming a high side driver. Preferably, a 3 V electromagnetic speaker is utilized wherein the speaker impedance is at least 18.5Ω, the speaker power is 122 mW at 1.5 V bias, and the speaker voltage is at most 3 V peak-to-peak. However, this implementation is more costly than the one depicted in FIG. 7A. Similarly, less power dissipation is provided than in the configurations of FIGS. 1 and *7a*.

Furthermore, an alternative construction of the control circuit is depicted in FIG. *7c* having the low-pass filter 44 of FIG. 1, with a modified buffer 130 provided by a transistor having a resistor connected to the emitter with the speaker 36 connected with the collector. Preferably, the buffer consists of a Darlington transistor together with a resistor forming a low side driver. It is connected with an 8 V electromagnetic speaker. The speaker preferably has an impedance of at least 80Ω, a power of 200 mW at 4 V bias, and a voltage of at most 8 V peak-to-peak. This buffer implementation generally costs the same as that depicted in the FIG. *7a* implementation. Such a construction provides a high side resistive load to the transistor which allows an inverting configuration capable of handling a greater loudness at the speaker, up to about 9 volts maximum.

FIG. *7d* depicts another construction for control circuit 10 wherein low-pass filter 44 is again utilized, but in combination a buffer 140 constructed from the corresponding transistor, and having a piezoelectric speaker 144 which shunts a resistor 142 to control voltage across the piezoelectric speaker. Preferably, the buffer consists of a transistor forming a high side driver. It is connected to a piezoelectric speaker shunted with a resistance. In this case, the transistor is downgraded to a high current variation since the power necessary to drive a Darlington transistor is no longer necessary. The resistor 142 in parallel with the piezo-electric speaker 144 makes the combination appear as an electromechanical device at the emitter of the transistor in buffer 140.

Figure 7A:
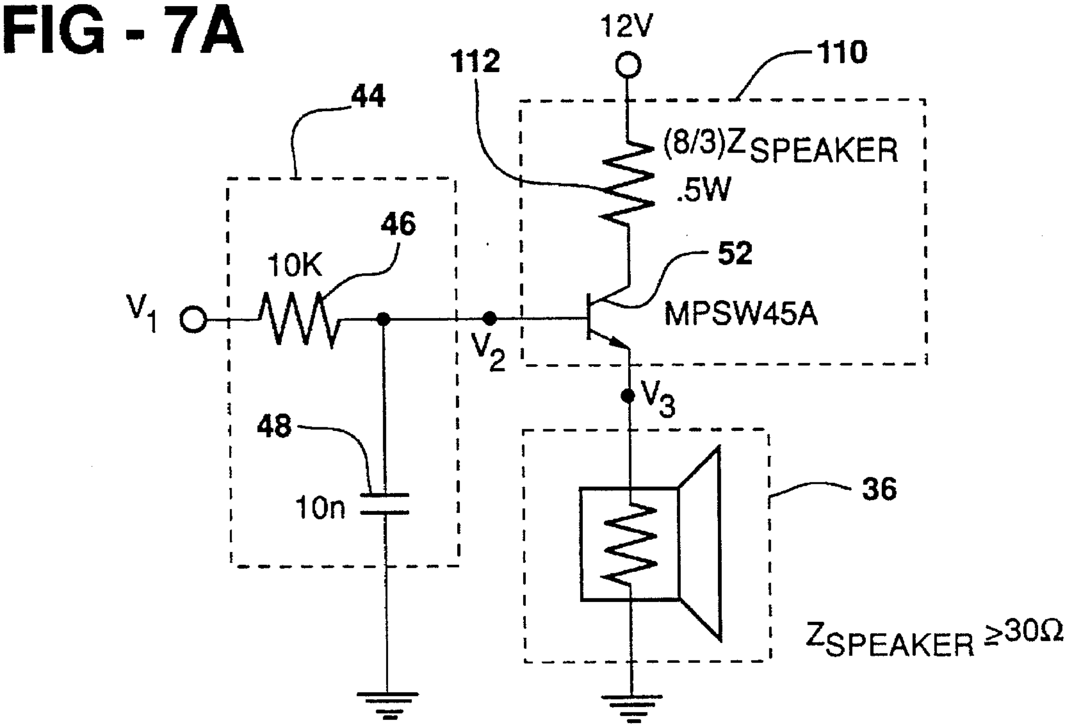
FIGS. 7*a*–7*f* depict various alternative arrangements for the control circuit of FIG. 1.
Figure 7B:
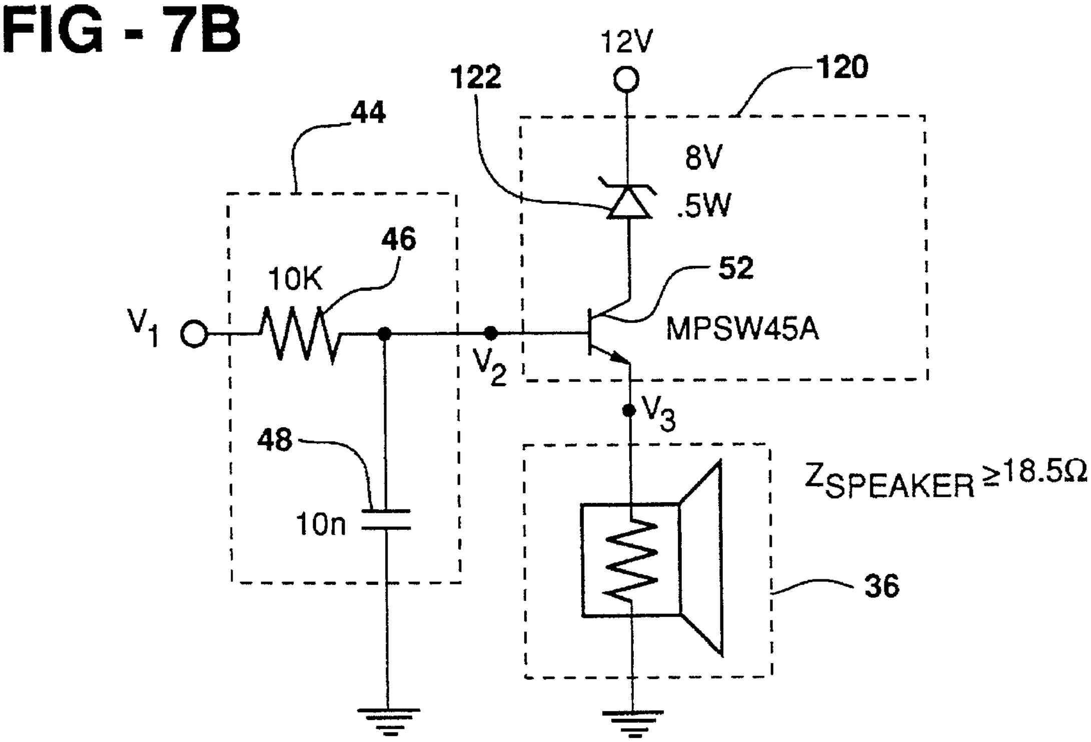
Figure 7C:
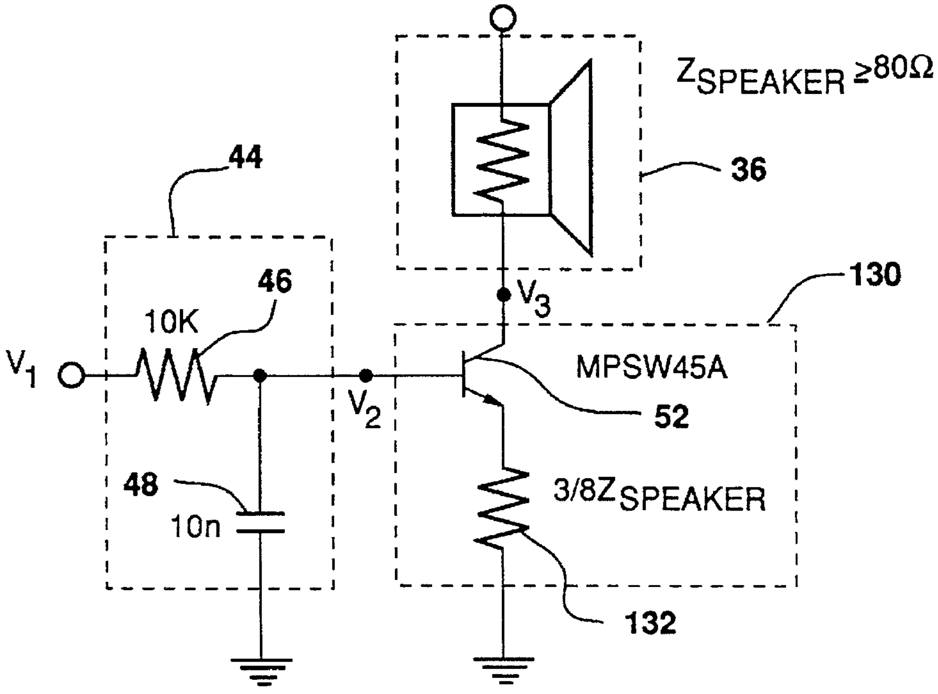
Figure 7D:
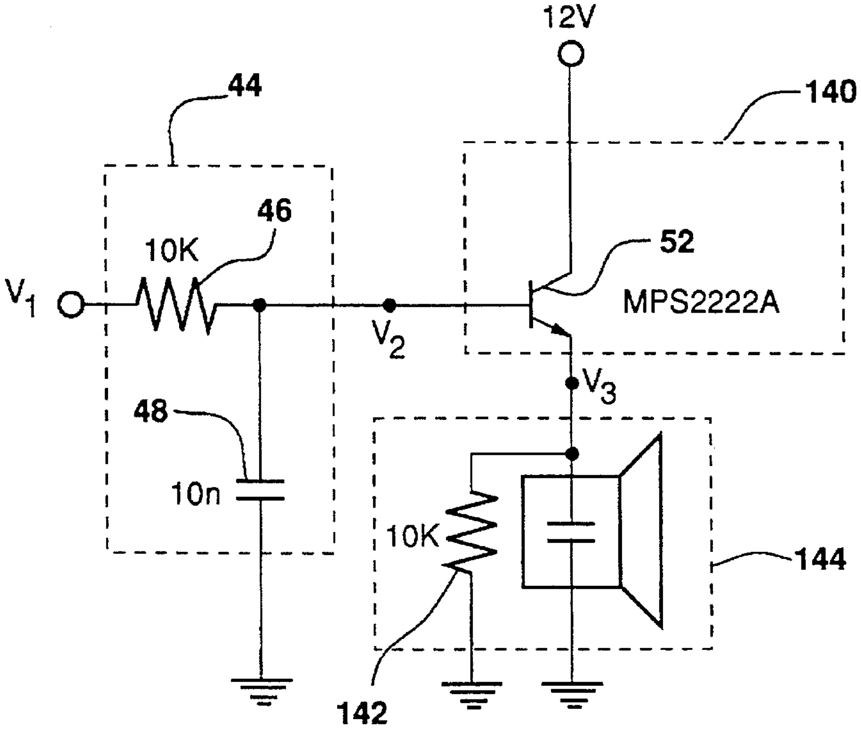
Figure 7E:
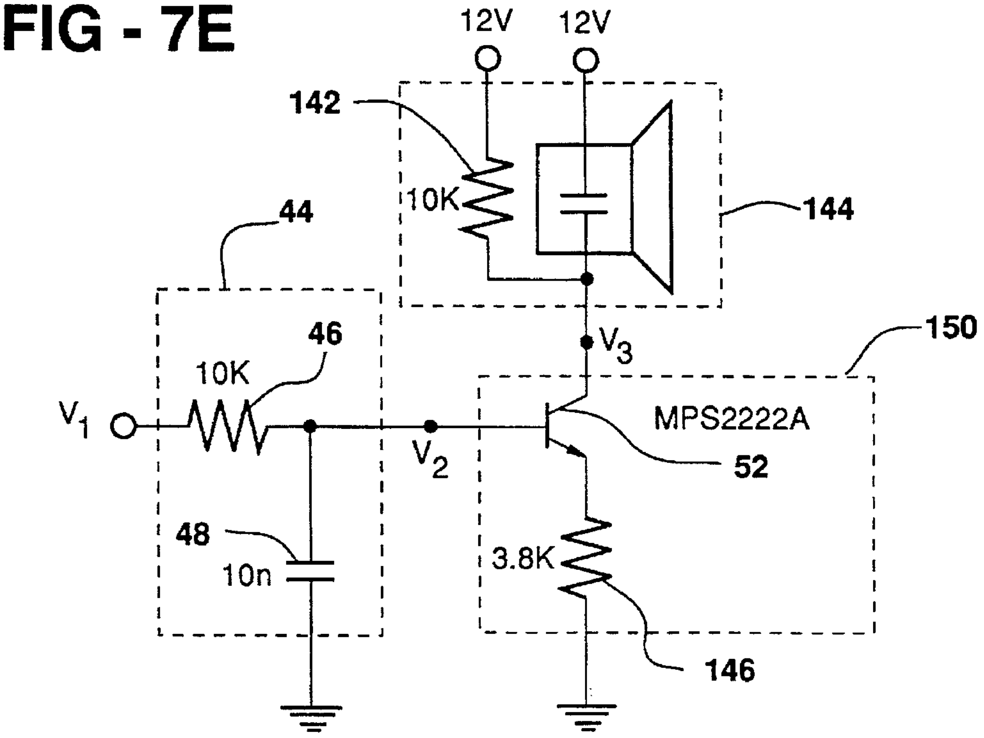

Furthermore, FIG. 7*e* depicts another alternative construction for control circuit 10 wherein low pass filter 44 is again utilized, but buffer 150 has the identical transistor as shown in FIG. 7*d* whereas the resistor 142 is added at the emitter, and piezo-electric speaker 144 in parallel with the resistor 146 is provided at the collector. Such a construction shunts the piezo-resistive speaker to control voltage across the piezo element. Likewise, utilization of resistor 142 in combination with the speaker placement at the collector provides for an inverting configuration which can handle increased loudness of about up to 9 volts.

Figure 7F:
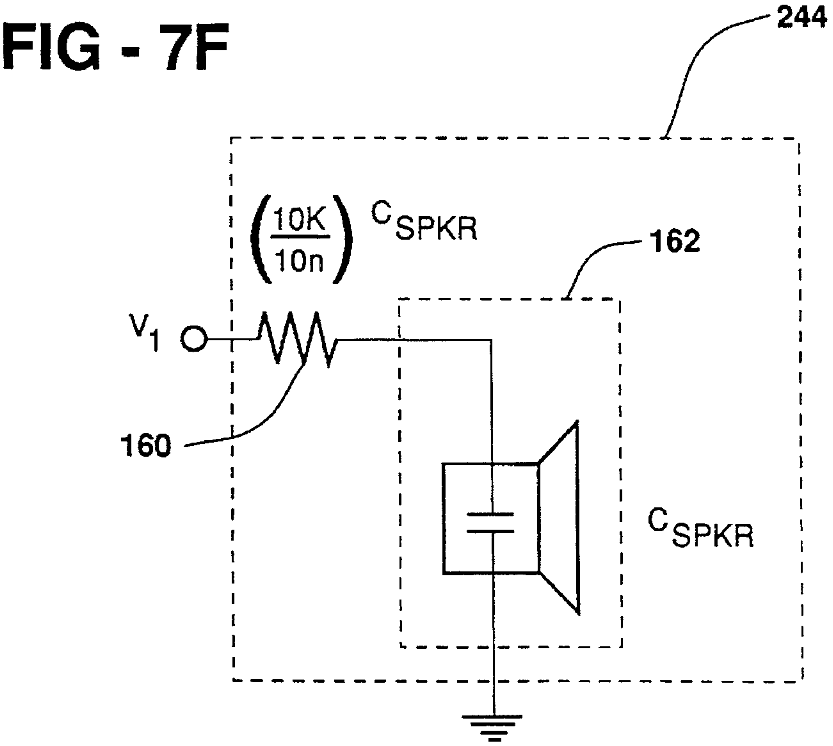

FIG. 7*f* depicts an alternative construction using a piezo-electric speaker 144 and a resistor 162. The filter 244 is formed by the resistor 160 in combination with the speaker 162. In this implementation, a buffer is inherently formed from the circuit wiring, and no actual active components are utilized. Furthermore, the speaker is a piezo-electric device. Therefore, with this implementation the need for a discrete buffer is eliminated. Such a construction produces a cheaper filter wherein a corresponding piezo-electric speaker will meet desired design requirements in certain applications. However, no DC path is provided to the speaker, and therefore no offset requirement is needed with the buffer construction.

It is to be understood that the invention as broadly claimed is not limited to any of the exact constructions illustrated and described above. For example, control circuit 44 can be replaced with a cascaded RC low-pass filter having a pair of circuits 44 connected in series, and buffer 110 can be replaced with a MOSFET. Still other changes and modifications may be made without departing from the spirit and scope of the invention as defined in the following claims.

We claim:

1. Chime generating circuitry, for use in a vehicle control system having a control means for monitoring the status of a vehicle condition, comprising:

(a) an oscillator circuit connected to a microcontroller;

(b) a microcontroller comprised of:

a microprocessor having a central processing unit, random access memory and read only memory, a plurality of inputs for monitoring the status of a vehicle condition including a first input for receiving a seat belt unbuckled signal, a second input for receiving a door open signal, a third input for receiving a key in the ignition signal, fourth input for receiving a signal from an accessory, each of said inputs being operable to transmit said signals from said inputs to said microprocessor, a single tri-statable output operable to generate a time-varying digital output signals, the tri-statable output having at least three states including an on-state, an off-state, and a high-impedance disconnect state, said high-impedance disconnect state being used to help generate a sinusoidal signal by repetitively holding the output signal at an intermediate level for a predetermined time period;

(c) a control circuit comprising:

a single stage low-pass filter circuit having an input receiving the digital output signal from said single tri-statable output and a first output for producing a first output voltage, a buffer having an input and an output, said input receiving said first output voltage from said low-pass filter circuit, said buffer output being operable to drive a tone-generating device.

2. The chime generating circuitry of claim 1 wherein said microcontroller generates said digital output signal from said single tri-statable output for input directly into said control circuit, and wherein said tone-generating device is a speaker.

3. The chime generating circuitry of claim 2 wherein said low-pass filter circuit is a single resistor connected in series with said single tri-statable output and a capacitor connected in parallel with said single output.

4. The chime generating circuit of claim 1 wherein said device is a piezo-electric speaker having an electrically driven input constructed and arranged to receive a second output voltage from said buffer output.

5. Chime generating circuitry, for use in a vehicle control system having a control means for monitoring the status of a vehicle condition, comprising:

a microprocessor-based chime control means, including a microprocessor having at least one tri-statable output, for generating a time-varying digital output signal, the tri-statable output having at least three states, including an on-state, an off-state and a high-impedance state, the digital output signal at the tri-statable output being controlled by the microprocessor so as to generate an approximate sinusoidal waveform for producing a corresponding exponentially decaying sinusoidal signal to an audio output device which in turn creates a corresponding decaying chime sound the approximate sinusoidal waveform including a plurality of periods during each sinusoidal cycle wherein the tri-statable output is placed in its high-impedance state for a predetermined length of time each period;

a low pass filter means having an input and an output, said input receiving the digital output signal from the tri-statable output;

a buffer means having an input and an output, said input of said buffer means receiving output from said filter means and said output of said buffer means producing a signal for delivery to a tone-generating audio output device.

6. The chime generating circuitry of claim 5 wherein the microprocessor-based control means includes a microcomputer having at least one input for monitoring the status of said vehicle condition.

7. The chime generating circuitry of claim 6 wherein said microcomputer includes memory means and processing means for executing a tone generating software program stored in said memory means to perform tone signal generation and substantially exponential tone signal amplitude decay via intermittent generation of a tri-statable signal directed to the single output.

8. The chime generating circuit of claim 5 wherein said low pass filter means includes two electrical circuit elements, the first element being a single resistor and the second element being a single impedance-altering circuit selected from the group of impedance elements consisting of capacitors and inductors.

9. The chime generating circuitry of claim 5 wherein said low-pass filter includes a resistor connected in series and a capacitor connected in parallel with the tri-statable output of the microprocessor.

10. The chime generating circuitry of claim 5 wherein said buffer means comprises an electrically conductive wire for interconnection with said audio output device.

11. The chime generating circuitry of claim 5 wherein said buffer means comprises a Darlington transistor.

12. The chime generating circuitry of claim 5 wherein said buffer means comprises a MOSFET.

13. The chime generating circuitry of claim 5 wherein said audio output device is a speaker which has an electrically driven input directly receiving the signal from said buffer means output.

14. The chime generating circuitry of claim 13 wherein said speaker is an electromagnetic speaker.

15. The chime generating circuitry of claim 13 wherein said speaker is a piezo-electric speaker.

16. A method for generating a desired audible chime signal with a chime generating circuit, the method comprising the steps of:

1) determining a chime signal for generation by said chime generating circuit via a microprocessor, the microprocessor including a control means, and a tri-state output and other outputs;

2) regulating via said control means the voltage of the output; to generate said chime signal at a desired signal frequency; and during a typical cycle of said chime signal;

3) increasing the voltage amplitude of the tri-state output when the output is pulled to a high state;

4) decreasing the voltage amplitude of the tri-state output when the output is pulled to a low state;

5) maintaining the voltage amplitude of the output when the output is in a disconnected high-impedance state; and 6) repeating steps 3 through 5 in order to generate a repetitive approximate sinusoidal signal to generate a chime signal; and 7) processing signals to other outputs via said microprocessor when the tri-state output is in the disconnect state.

17. The method of claim 16 wherein said step 6) is carried out by amplitude decay regulating said approximate sinusoidal signal to produce an exponentially decaying chime signal.

18. The method of claim 17 wherein said step of output regulating to obtain a desired signal frequency includes controlling said tri-statable output to said chime generating circuit with a timing control signal developed by said microcomputer operating under the control of a software program.

19. The method of claim 18 wherein said step of output regulating to obtain a desired amplitude decay chime signal includes controlling said tri-statable output to said chime generating circuit with a timing control signal developed by said microcomputer under control of said software program.

* * * * *